(12) United States Patent
Cheung

(10) Patent No.: US 11,537,185 B2
(45) Date of Patent: Dec. 27, 2022

(54) COMMON-MODE VOLTAGE CONTROL FOR HIGH-SPEED TRANSCEIVERS

(71) Applicant: Diodes Incorporated, Milpitas, CA (US)

(72) Inventor: Hung-Yan Cheung, Tsuen Wan (HK)

(73) Assignee: Diodes Incorporated, Plano, TX (US)

( * ) Notice: Subject to any disclaimer, the term of this patent is extended or adjusted under 35 U.S.C. 154(b) by 89 days.

(21) Appl. No.: 17/327,425

(22) Filed: May 21, 2021

(65) Prior Publication Data

US 2022/0374061 A1 Nov. 24, 2022

(51) Int. Cl.
*G06F 1/26* (2006.01)
*G06F 13/42* (2006.01)
*G06F 13/40* (2006.01)

(52) U.S. Cl.
CPC ............ *G06F 1/26* (2013.01); *G06F 13/4045* (2013.01); *G06F 13/4282* (2013.01); *G06F 2213/0042* (2013.01)

(58) Field of Classification Search
CPC .... G06F 1/26; G06F 13/4045; G06F 13/4282; G06F 2213/0042; G06F 1/30; G06F 1/3287; G06F 13/4004; G06F 13/4027; G06F 13/4068
See application file for complete search history.

(56) References Cited

U.S. PATENT DOCUMENTS

| | | | | |
|---|---|---|---|---|
| 8,804,792 | B1* | 8/2014 | Cheung | H04L 25/20 710/48 |
| 10,812,067 | B1* | 10/2020 | Delshadpour | H04L 25/0298 |
| 11,245,555 | B1* | 2/2022 | Delshadpour | H04L 25/03949 |
| 2015/0277527 | A1* | 10/2015 | Liu | G06F 1/266 713/300 |
| 2016/0336741 | A1* | 11/2016 | Chen | H01L 27/0255 |
| 2017/0358891 | A1* | 12/2017 | Peng | H01R 13/6616 |
| 2020/0042488 | A1* | 2/2020 | Maung | G06F 13/4295 |
| 2020/0073839 | A1* | 3/2020 | Maung | G06F 13/382 |
| 2020/0409444 | A1* | 12/2020 | Delshadpour | H04L 25/0286 |

OTHER PUBLICATIONS

"HX3C USB Type-C Hub with PD". CYUSB3343. Document No. 002-10462. Revision *C. Cypress Semiconductor Corporation. Aug. 16, 2017. (Year: 2017).*

* cited by examiner

*Primary Examiner* — Thomas J. Cleary
(74) *Attorney, Agent, or Firm* — Joseph M. Villeneuve; Weaver Austin Villeneuve & Sampson LLP; Steven A. Shaw

(57) ABSTRACT

Circuits and techniques are described for high-speed transceivers (e.g., repeaters such as re-drivers or re-timers) that ensure that the instantaneous voltage at an input or output of a connected device remains within a desired or specified voltage range.

20 Claims, 4 Drawing Sheets

COMMON-MODE VOLTAGE CONTROL FOR HIGH-SPEED TRANSCEIVERS

BACKGROUND

There are a variety of transmission protocols used to transmit serial data between connected devices. Examples of such protocols include the DisplayPort standard, the High-Definition Multimedia Interface (HDMI) standard, the Serial ATA standard, the Peripheral Component Interconnect Express (PCI-E) standard, the Universal Serial Bus (USB) standard, the Hypertransport protocol, Infiniband protocol, the XAUI protocol, and the Ethernet protocol. Each of these protocols has evolved over time to include multiple generations and, at least for some, multiple versions within each generation. Serial interfaces may be implemented according to any of these standards using either single-ended or differential signaling.

As is well known, the integrity of the signals transmitted via such interfaces degrades as the frequency or data rate of the signals and/or the length of the transmission lines increase. The problem of signal degradation over serial interfaces is typically handled by the introduction of one or more high-speed transceivers referred to as repeaters between the connected devices. Repeaters (e.g., re-drivers or re-timers) are devices that restore signal integrity as the data are being transmitted between connected devices.

A recent update to the USB standard includes a change to the allowable range for the instantaneous voltage at the other side of the AC coupling capacitor connected to a repeater's transmit port (also referred to as the connector side), i.e., the instantaneous voltage seen at the downstream device. This instantaneous voltage is referred to as $V_{TX\_DC+AC\_CONN}$ in the USB 3.2 specification and V_TX_DC_AC_CONN in the USB4 specification. The newly specified range for this voltage (also referred to herein as the downstream instantaneous voltage) is −0.5 to 1 volt.

During operation of some repeaters, the downstream instantaneous voltage is typically proportional to the voltage at the transmit port (also referred to herein as the TX bias voltage). When there is a positive transition on the TX bias voltage, there is corresponding positive transition of the downstream instantaneous voltage. Similarly, a negative transition on the TX bias voltage corresponds to a negative transition of the downstream instantaneous voltage. During normal operation, the range of the transitions on the TX bias voltage may be controlled to ensure that the downstream instantaneous voltage stays within the range specified by the USB standard.

However, for some repeater designs, the downstream instantaneous voltage may also be affected by the discharge rate of the repeater's supply voltage (VDD) when the repeater begins powering down. As VDD drops, there is a corresponding drop in the downstream instantaneous voltage which, under certain conditions, can drop below −0.5 volts and therefore violate the lower end of the range now specified by the USB standard.

One approach to solving this issue is to add a special power-off sequence to the repeater to ensure this new requirement is met. This would require an additional general purpose input/output (GPIO) pin to control the repeater's enable input. The new GPIO would be used to initiate a controlled power-down mode in which the repeater goes through the power-off sequence before VDD starts to discharge. However, many existing systems may not have an additional GPIO available for this purpose. And for those that do, the timing requirements of the power-off sequence may be undesirable to system designers for a variety of reasons.

SUMMARY

According to a particular class of implementations, a device includes a first receive port configured to receive a first signal from a first device, first circuitry configured to process the first signal to restore one or more aspects of the first signal thereby generating a second signal, and a first transmit port configured to transmit the second signal to a second device via a first coupling capacitor. The device includes an external capacitor node configured for connection to an external capacitor. The external capacitor node is connected to the first transmit port. The device includes a supply voltage node configured for connection to a supply voltage. The device includes second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node. The threshold represents an instantaneous voltage at an input of the second device that is within a voltage range specified by a serial data transmission protocol.

According to a specific implementation of this class, the external capacitor is characterized by a discharge rate that ensures that the instantaneous voltage at the input of the second device remains within the voltage range after the external capacitor node is disconnected from the supply voltage node.

According to another specific implementation of this class, the serial data transmission protocol comprises the Universal Serial Bus (USB) protocol. According to a more specific implementation, the instantaneous voltage at the input of the second device corresponds to V_TX_DC_AC_CONN of the USB specification and the voltage range is −0.5 to 1.0 volts.

According to another specific implementation of this class, the device includes a second receive port configured to receive a third signal from the second device, third circuitry configured to process the third signal to restore one or more aspects of the third signal thereby generating a fourth signal, and a second transmit port configured to transmit the fourth signal to the first device via a second coupling capacitor. The external capacitor node is connected to the second transmit port, and the threshold also represents an instantaneous voltage at an input of the first device that is within the voltage range specified by the serial data transmission protocol.

According to another specific implementation of this class, the device is a re-driver and the first circuitry is configured to boost a data component of the first signal.

According to another specific implementation of this class, the device is a re-timer and the first circuitry is configured to recover a data component and a clock component of the first signal.

According to another specific implementation of this class, the first receive port and the first transmit port employ single-ended signaling.

According to another specific implementation of this class, the first receive port and the first transmit port employ differential signaling, and the input of the second device comprises a differential input. According to a more specific implementation, the threshold represents a first instantaneous voltage and a second instantaneous voltage at the differential input of the second device that are within the voltage range specified by the serial data transmission protocol. The first instantaneous voltage corresponds to a first signal line of the differential input, and the second instantaneous voltage corresponds to a second signal line of the differential input.

According to another class of implementations, a system includes a first device, a second device, and a serial data interface connecting the first and second devices. The serial data interface includes a repeater. The repeater includes a first receive port configured to receive a first signal from the first device, first circuitry configured to process the first signal to restore one or more aspects of the first signal thereby generating a second signal, and a first transmit port configured to transmit the second signal to the second device via a first coupling capacitor. The system includes an external capacitor connected to an external capacitor node and the first transmit port, and a supply voltage node connected to a supply voltage. The system includes second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node. The threshold represents an instantaneous voltage at an input of the second device that is within a voltage range specified by a serial data transmission protocol.

According to a specific implementation of this class, the external capacitor is characterized by a discharge rate that ensures that the instantaneous voltage at the input of the second device remains within the voltage range after the external capacitor is disconnected from the supply voltage node.

According to another specific implementation of this class, the serial data transmission protocol comprises the Universal Serial Bus (USB) protocol.

According to another specific implementation of this class, the instantaneous voltage at the input of the second device corresponds to V_TX_DC_AC_CONN of the USB specification and the voltage range is −0.5 to 1.0 volts.

According to another specific implementation of this class, the repeater includes a second receive port configured to receive a third signal from the second device, third circuitry configured to process the third signal to restore one or more aspects of the third signal thereby generating a fourth signal, and a second transmit port configured to transmit the fourth signal to the first device via a second coupling capacitor. The external capacitor node is connected to the second transmit port, and the threshold also represents an instantaneous voltage at an input of the first device that is within the voltage range specified by the serial data transmission protocol.

According to another specific implementation of this class, the repeater is a re-driver and the first circuitry is configured to boost a data component of the first signal.

According to another specific implementation of this class, the repeater is a re-timer and the first circuitry is configured to recover a data component and a clock component of the first signal.

According to another specific implementation of this class, the first receive port and the first transmit port employ single-ended signaling.

According to another specific implementation of this class, the first receive port and the first transmit port employ differential signaling, and the input of the second device comprises a differential input. According to a more specific implementation, the threshold represents a first instantaneous voltage and a second instantaneous voltage at the differential input of the second device that are within the voltage range specified by the serial data transmission protocol. The first instantaneous voltage corresponds to a first signal line of the differential input, and the second instantaneous voltage corresponds to a second signal line of the differential input.

According to another class of implementations, a device includes a receive port configured to receive a first signal from a first device, first circuitry configured to process the first signal to restore one or more aspects of the first signal thereby generating a second signal, and a transmit port configured to transmit the second signal to a second device via a coupling capacitor. The device includes an external capacitor node configured for connection to an external capacitor. The external capacitor node is connected to the transmit port. The device includes a supply voltage node configured for connection to a supply voltage. The device includes second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node. The threshold represents an instantaneous voltage at an input of the second device that is above a lower end of a voltage range specified by a version of the Universal Serial Bus specification.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure relates to circuits and techniques for high-speed transceivers (e.g., repeaters such as re-drivers or re-timers) that ensure that the instantaneous voltage at an input or output of a connected device remains within a desired or specified voltage range. A particular class of implementations is described herein that relates specifically to the instantaneous voltage at the other (connector) side of the AC coupling capacitor as specified by the USB standard (e.g., $V_{TX\_DC+AC\_CONN}$ in the USB 3.2 specification or V_TX_DC_AC_CONN in the USB4 specification). However, it should be noted that the circuits and techniques enabled by the present disclosure are more generally applicable. That is, any serial interface or protocol that is characterized by a similar common mode voltage issue may benefit from the techniques described herein. The scope of the present disclosure should therefore not be limited by reference to such implementations.

Figure 1A:
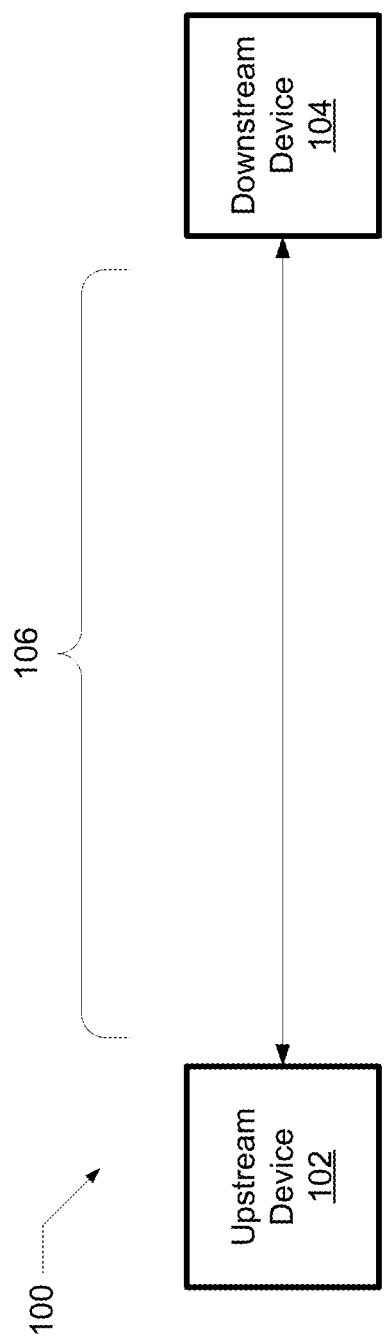
FIG. 1A is a simplified block diagram of a serial data transmission system.

FIG. 1A is a block diagram depicting an example of an implementation of a serial interface communication system 100. System 100 may be implemented according to any of the variety of transmission protocols mentioned above including, for example, the DisplayPort standard, the HDMI standard, the Serial ATA standard, the PCI-E standard, the USB standard, the Hypertransport protocol, Infiniband protocol, the XAUI protocol, the Ethernet protocol, or any of the generations and/or versions of each. Serial bus communication system 100 includes upstream device 102, downstream device 104, and serial bus 106. It should be appreciated that serial bus communication system 100 may be a bidirectional communication system, where the upstream device 102 is capable of both transmitting and receiving, and the downstream device 104 is capable of both transmitting and receiving.

It should also be appreciated that bidirectional implementations of serial bus communication system 100 may include full-duplex implementations and half-duplex implementations with switching interfaces for the transmit and receive ports. It should further be appreciated that serial bus communication system 100 may be a unidirectional communication system, in which upstream device 102 is capable of transmitting and downstream device 104 is capable of receiving.

Figure 1B:
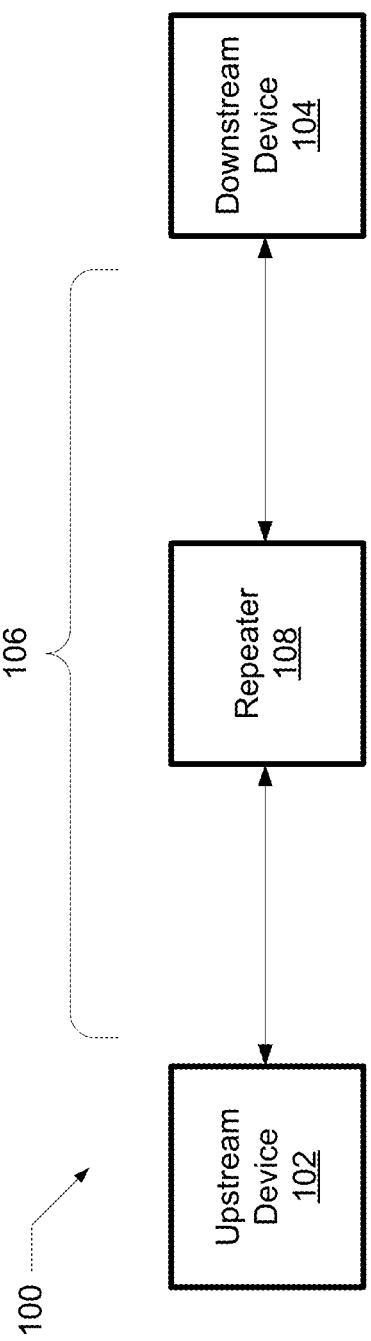
FIG. 1B is a simplified block diagram of a serial data transmission system including a repeater.

FIG. 1B is a block diagram depicting an example of an implementation in which serial bus 106 includes one or more intermediary high-speed signal conditioning transceivers (e.g., repeater 108) coupled in series, with the number of such devices depending on trace or cable length of the serial bus. Repeater 108 may be used as a serial link driver interface for serial bus 106, or multiple repeaters 108 may be used to provide a serial link driver interface for serial bus 106. Additionally, it should be appreciated that serial bus 106 includes traces or cables formed in or using a transmission medium such as conductive material or other means for propagating electric signals. It should further be appreciated that implementations of serial bus communication system 100 including one or more repeaters may be full-duplex bidirectional, half-duplex bidirectional, or unidirectional as described for FIG. 1A.

Upstream device 102 may be implemented in a larger device or system such as any in of a variety of integrated circuits or devices including, but not limited to, input/output ("I/O") hubs, root complexes, servers, and laptop docking stations, among others. Furthermore, it should be appreciated that downstream device 104 may be embedded in a larger device or system such as any in a variety of peripheral devices including, but not limited to, hard disk drives, graphics cards, and daughter cards, among others. It should be appreciated that reference to upstream device and downstream device are for purposes of example, and the examples of upstream device 102 and downstream device 104 listed above can correspond to terminal communication devices for serial standards that do not utilize a hierarchical topology.

Communication via serial bus 106 may use a differential or single-ended signaling protocol. For example, upstream device 102 may include a differential output driver (not shown) for providing a differential signal. Repeater 108, when present, processes an output transmission from upstream device 102 to provide such processed output transmission to another repeater or directly to downstream device 104. Downstream device 104 may include a differential input driver (not shown). There are many known differential digital signaling protocols that may be used with serial bus communication system 100 such as, for example, differential Stub-Series Terminated Logic ("SSTL"), differential High-Speed Transceiver Logic ("HSTL"), Low-Voltage Differential Signaling ("LVDS"), differential Low-Voltage Positive Emitter Coupled Logic ("LVPECL"), and Reduced Swing Differential Signaling ("RSDS") among other differential digital signaling protocols. Additionally, implementations are contemplated that use single-ended serial interface protocols such as, for example, Low Voltage Transistor-Transistor Logic ("LVTTL") such as used for PCI, and Low Voltage Complementary Metal Oxide Semiconductor ("LVCMOS"), among other single-ended serial interface protocols. Conventionally PCI uses an LVTTL input buffer and a push-pull output buffer.

Figure 2:
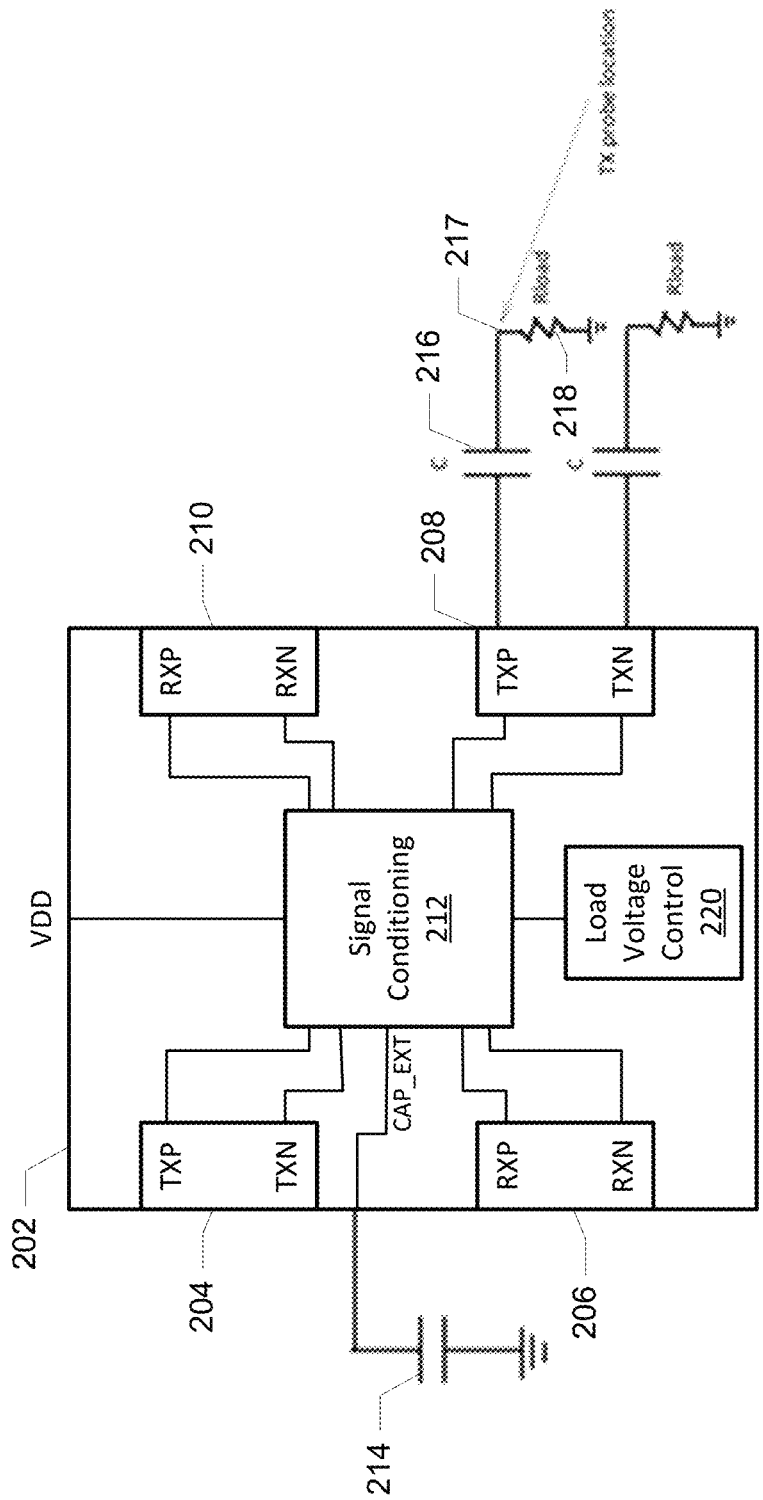
FIG. 2 is a simplified diagram of a particular implementation of repeater.

FIG. 2 shows a repeater 202 (e.g., a specific type of repeater 108) configured for testing for compliance with the USB standard. Repeater 202 is shown as a bidirectional device that includes transmit (TX) and receive (RX) ports 204 and 206 for connecting with an upstream device (not shown) and TX and RX ports 208 and 210 for connecting with a downstream device (not shown). In the depicted example, the ports of repeater 202 employ differential signaling with the designations P and N (e.g., TXN and TXP) representing the positive and negative signal lines of the differential pair. It should be noted, however, that single-ended implementations are contemplated.

Repeater 202 also includes signal conditioning circuitry 212 that may be implemented in a variety of ways depending on the type of repeater. For example, if repeater 202 is a re-driver, signal conditioning circuitry 212 might include largely analog circuitry designed to boost the higher frequency components (e.g., a serial data stream) of a received signal from one connected device before transmitting the boosted signal on to another connected device. Alternatively, if repeater 202 is a re-timer, signal conditioning circuitry might include mixed-signal (analog and digital) circuitry designed to recover the data and clock components of a received signal before transmitting the recovered signal on to the connected device. The details of signal conditioning circuitry 212 are not germane to the present disclosure and so are not shown or described. However, as discussed above with reference to repeater 108, given that repeater 202 is depicted as a bidirectional device, circuitry 212 might be shared between the downstream and upstream paths or may include duplicate circuitry dedicated to each path.

Repeater 202 is also connected to an external capacitor 214 at a connection node designated CAP_EXT as would typically be the case when repeater 202 is deployed in a system. Such a capacitor acts as a charge reservoir, delivering power when the external power supply drops below a threshold.

TXP of TX port 208 is shown connected to an AC coupling capacitor 216 and a load resistor 218 as part of a test configuration in which compliance of repeater 202 with the USB specification may be determined. Although all of the ports would typically be tested in this way, only connections to the signal lines of TX port 208 are shown for simplicity. Such a test configuration may be used to determine whether the instantaneous voltage at node 217 between capacitor 216 and resistor 218 (e.g., $V_{TX\_DC+AC\_CONN}$ in the USB 3.2 specification or V_TX_DC_AC_CONN in the USB4 specification) stays within the range specified by the USB standard. In this example, the value of resistor 218 is 200 kilo-ohms, in which case the specified range is −0.5 to 1.0 volts. In another example, the value of resistor 218 might be 50 ohms, in which case the specified range is −0.3 to 1.0 volts. The value of capacitor 216 is large, e.g., the USB spec assumes a maximum of 265 nF. Only one of the ports of repeater 202 is shown as being configured for testing for simplicity. It will be understood that all four of the ports may be configured for testing in the manner shown.

As discussed above, during normal operation of repeater 202, transitions at TXP of TX port 208 result in proportionate transitions at node 217. In addition, when repeater 202 powers down, the discharge rate of the supply voltage (VDD) of repeater 202 also affects the instantaneous voltage at node 217. In either case, in order to be compliant with the updated USB specifications, the instantaneous voltage at node 217 must stay within the specified range. According to a particular class of implementations, load voltage control circuitry 220 is provided to ensure this compliance. A particular implementation will now be described with reference to FIG. 2, the schematic of FIG. 3, and the timing diagram of FIG. 4.

Figure 3:
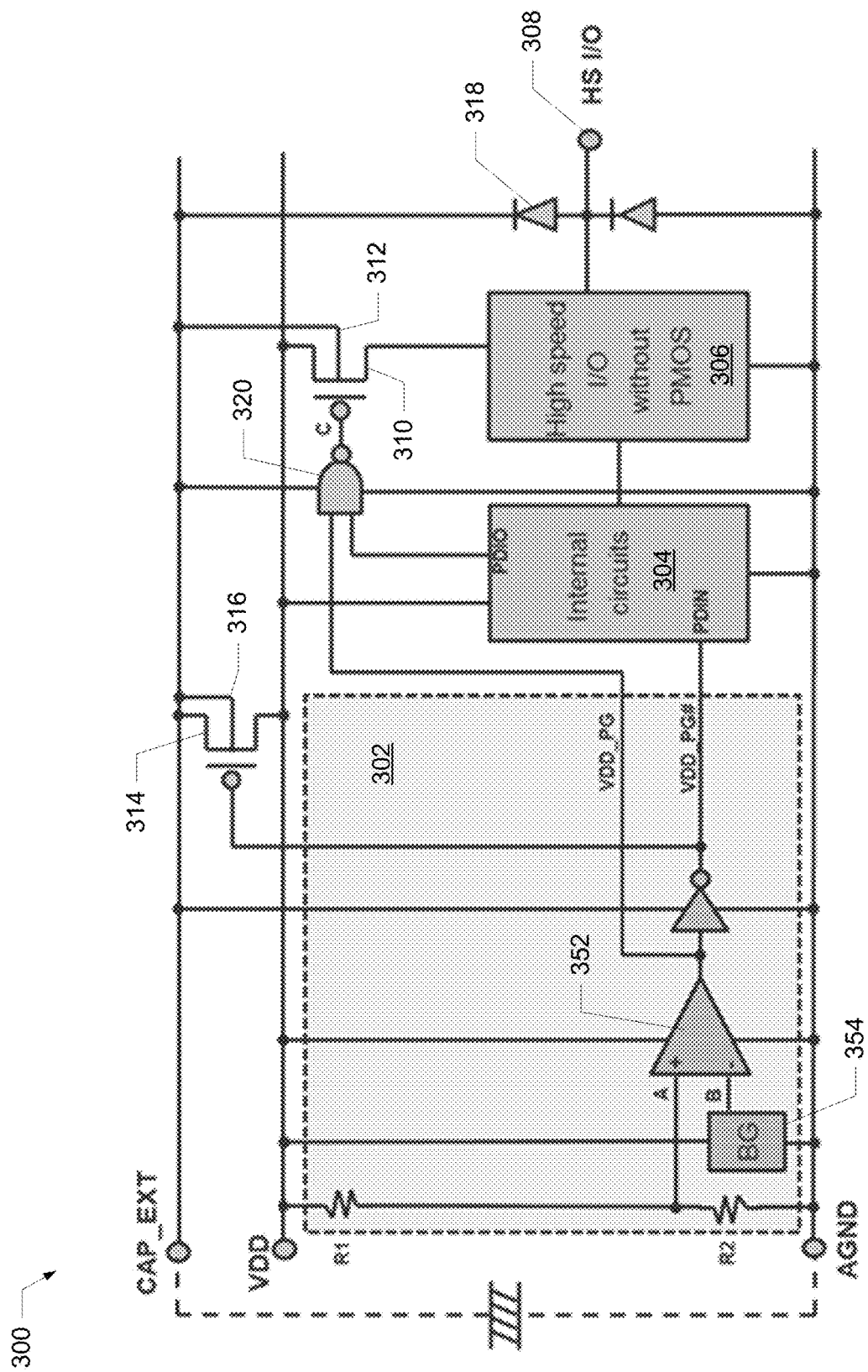
FIG. 3 is a simplified schematic of a portion of a particular implementation of a repeater.

FIG. 3 is a simplified schematic of the portions of a repeater 300 (e.g., repeater 108 or 202) that are relevant to the operation of load voltage control circuitry 302. The signal conditioning circuitry of repeater 300 is represented by circuitry 304 labeled "Internal Circuits" and circuitry 306 labeled "High Speed I/O without PMOS." As mentioned above, the details of this circuitry are not particularly relevant to the operation of control circuitry 302 and so are not described. It is sufficient to note that circuitry 306 includes an I/O buffer connected to node 308 (labeled "HS I/O") which, for the purposes of this example, is a single-ended output node of a TX port of repeater 300 (which may or may not be a differential output port). When repeater 300 is included in a system, node 308 is typically connected to a downstream device (e.g., represented by load resistor 218 of FIG. 2) via an AC coupling capacitor (e.g., capacitor 216).

During normal operation of repeater 300, a supply voltage (VDD) provides power directly to circuitry 304 and to circuitry 306 via PMOS transistor 310. The intrinsic body diode of PMOS 310 (represented by 312) is shown as connected to the CAP_EXT node to which an external capacitor (e.g., capacitor 214) is connected. Also during normal operation, VDD is connected to CAP_EXT via PMOS transistor 314 and its body diode (represented by 316). An additional thing to note is that, during normal operation, the bias voltage at node 308 (also referred to as the TX bias voltage) is proportional to VDD.

Figure 4:
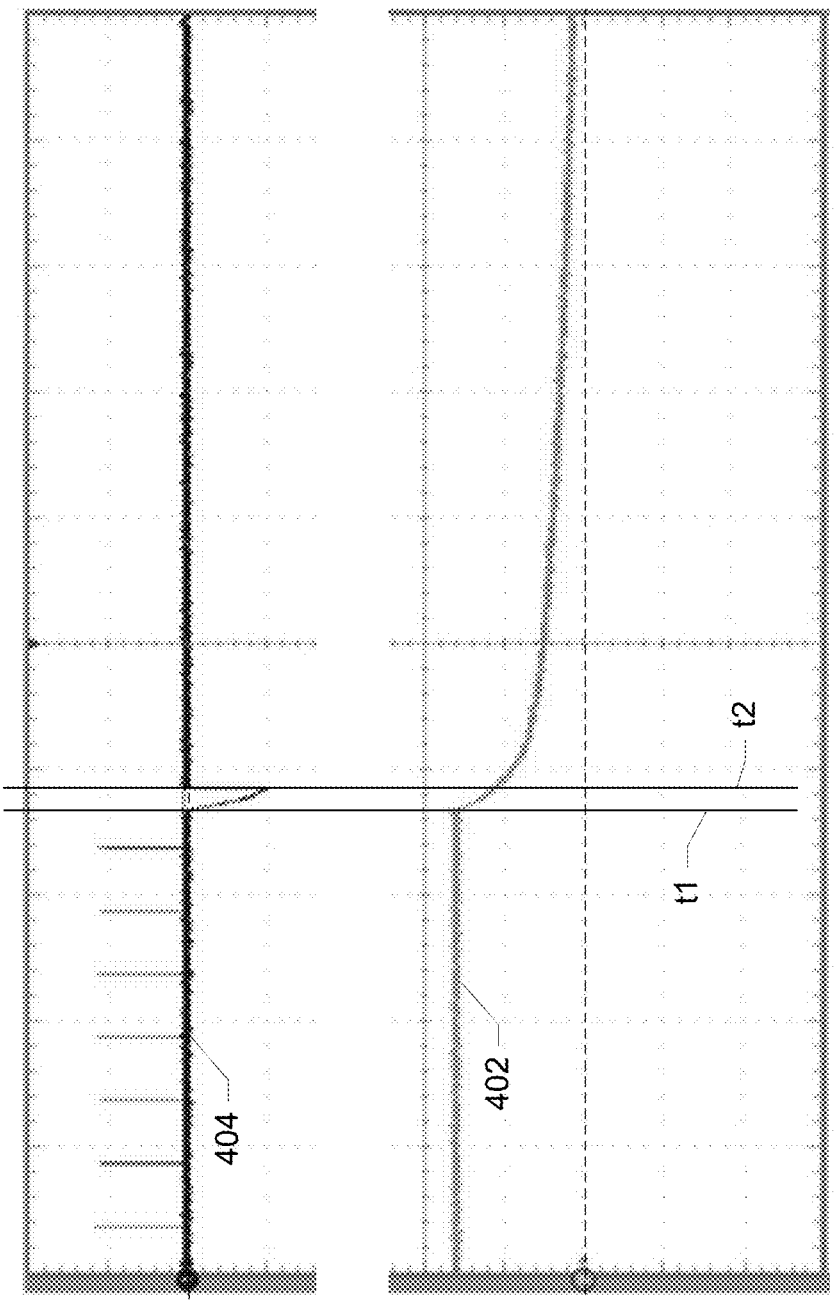
FIG. 4 is a timing diagram illustrating operation of a particular implementation of a repeater.

Referring now to FIG. 4, two signals are depicted; the bottom signal 402 (2.0 volts per division on the vertical scale) representing the supply voltage VDD for a repeater (e.g., repeater 108, 202, or 300) and the top signal 404 (500 millivolts per division) representing the instantaneous voltage on the opposite side of the AC coupling capacitor connected to a TX port of the repeater (e.g., node 217 of FIG. 2). The zero for each signal is depicted by the corresponding dashed line.

At t1, VDD begins to drop due, for example, to the beginning of a power down. Because the voltage at HS I/O node 308 (not shown) is proportional to VDD, it follows VDD and also begins to drop. The AC coupling capacitor (e.g., capacitor 216) acts as a low resistance path (effectively a short circuit), conducting current from ground through the load (e.g., resistor 218) dropping the instantaneous voltage (e.g., at node 217) below zero.

In addition, under some operating modes, node 308 may be in a high impedance state, so the TX bias voltage at the TX port of the repeater (e.g., HS I/O node 308) does not maintain its proportionality to VDD, dropping more slowly than the discharge rate of VDD, with VDD eventually dropping below the TX bias voltage. Without the control circuitry enabled by the present disclosure, the consequence of this may be understood with reference to FIG. 3.

Due to drop in VDD, the TX bias voltage drops accordingly. Without any control, the TX bias voltage will continue to drop until VDD reaches 0 volts. Hence, the drop in the TX bias voltage will eventually cause the instantaneous voltage at node 217 to drop below −0.5 volts and violate the lower limit of the specified range.

Therefore, according to the specific implementation depicted in FIG. 3, load voltage control circuitry 302 acts to prevent the instantaneous voltage on the other side of the AC coupling capacitor (e.g., the voltage at node 217) from dropping below the lower end of the specified range. Circuitry 302 employs a comparator 352 to compare a voltage at node A divided down from VDD (via resistors R1 and R2) to a reference voltage at node B generated by bandgap device 354. When VDD drops sufficiently that the voltage at node A goes below the voltage at node B (time t2 in FIG. 4), the output of comparator 352 (VDD_PG or VDD "power good") goes from high to low. An inverted version of VDD_PG (i.e., VDD_PG #) signals circuitry 304 to power down (via input PDIN). VDD_PG going high also remove power from circuitry 306 by turning PMOS transistor 310 off via NAND gate 320. VDD_PG # also turns off PMOS transistor 314, disconnecting CAP_EXT from VDD.

By removing power from circuitry 306, HS I/O node 308 goes to a high impedance state, e.g., effectively an open circuit looking back into the powered down I/O buffer of the port. This removes the leakage current paths due to the various associated bias elements, stopping the flow of current through the downstream load and the AC coupling capacitor (e.g., resistor 218 and capacitor 216) bringing the instantaneous voltage at the load back to zero as reflected in signal 404 at time t2 in FIG. 4.

Just after t2, VDD continues to drop with the external supply voltage, but the TX bias voltage will be kept unchanged for a while because node 308 is in a high impedance state. Subsequently, as the voltage at CAP_EXT drops below the TX bias voltage, diode 318 and body diode of PMOS transistor 310 would become forward biased, presenting new leakage current paths. But, by selecting the appropriate value for external capacitor 214, the node voltage of CAP_EXT will discharge slowly enough to prevent the instantaneous voltage at node 217 from violating the lower limit of the specified range.

The point at which VDD_PG switches from one to zero may be selected to ensure that the instantaneous downstream voltage (IDV) has not yet violated the lower end of the specified voltage range. A numerical example for the schematic of FIG. 3 will be instructive.

In this example, R1 and R2 divide a VDD of 3.3 volts down by 0.268× at node A. This voltage is compared to a bandgap voltage of 0.71 at node B. When VDD reaches 2.65 volts, the output of comparator 352 transitions from high to low such that VDD_PG=0 volts. At that point, the output buffer at HS I/O goes to a high impedance state, and no current flows from the AC coupling capacitor or through Rload with the result that IDV jumps back up to ground as shown at time t2 in FIG. 4.

The bandgap voltage reference and the values of R1 and R2 are selected to ensure that the power-on/off threshold voltage for the repeater is reached before IDV reaches −0.5 volts. HS I/O is about 0.75× of VDD. IDV is about 0.75× of the drop in VDD. A drop of 0.65 volts in VDD (from 3.3 volts to the 2.65 volt power off threshold) corresponds a drop in IDV (from ground) of 0.75×0.65=0.488 volts. Thus, in this example, IDV goes back to 0 volts just before the −0.5 volts lower limit of the USB specification.

In addition, by disconnecting CAP_EXT from VDD, the voltage at HS I/O node 308 no longer tracks the discharge rate of VDD, instead tracking the discharge of the external capacitor connected to CAP_EXT. That is, even though CAP_EXT is disconnected from VDD, the voltage on that node will continue to discharge at a rate that is inversely proportional to the size of the external capacitor. The value of the external capacitor may therefore be selected to ensure that this discharge rate is sufficiently slow that the leakage current paths represented by diode 318 and the body diode of PMOS transistor 310 (which become active when the voltage at CAP_EXT falls below HS I/O) never draw enough current that IDV is in danger of violating the lower limit of the specified range after time t2. For this example, and for the waveforms depicted in FIG. 4, the value of the external capacitor was selected to be 2.2 micro-Farads.

More generally, depending on the value of VDD and the relationship between VDD and the voltage at HS I/O, selection of the appropriate power good threshold and the appropriate value for the external capacitor can ensure that the instantaneous downstream voltage remains within the specified range. And as mentioned above, this may be done for each of the signal lines for each of the TX and RX ports for a high-speed transceiver to ensure that each remains within the specified range.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A device, comprising:
a first receive port configured to receive a first signal from a first device;
first circuitry configured to process the first signal to restore one or more aspects of the first signal thereby generating a second signal;
a first transmit port configured to transmit the second signal to a second device via a first coupling capacitor,
an external capacitor node configured for connection to an external capacitor, the external capacitor node being connected to the first transmit port;
a supply voltage node configured for connection to a supply voltage; and
second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node, wherein the threshold represents an instantaneous voltage at an input of the second device that is within a voltage range specified by a serial data transmission protocol.

2. The device of claim 1, further comprising the external capacitor, wherein the external capacitor is characterized by a discharge rate that ensures that the instantaneous voltage at the input of the second device remains within the voltage range after the external capacitor node is disconnected from the supply voltage node.

3. The device of claim 1, wherein the serial data transmission protocol comprises the Universal Serial Bus (USB) protocol.

4. The device of claim 3, wherein the instantaneous voltage at the input of the second device corresponds to V_TX_DC_AC_CONN of the USB specification and the voltage range is −0.5 to 1.0 volts.

5. The device of claim 1, further comprising:
a second receive port configured to receive a third signal from the second device;
third circuitry configured to process the third signal to restore one or more aspects of the third signal thereby generating a fourth signal; and
a second transmit port configured to transmit the fourth signal to the first device via a second coupling capacitor,
wherein the external capacitor node is connected to the second transmit port, and wherein the threshold also represents an instantaneous voltage at an input of the first device that is within the voltage range specified by the serial data transmission protocol.

6. The device of claim 1, wherein the device is a re-driver and the first circuitry is configured to boost a data component of the first signal.

7. The device of claim 1, wherein the device is a re-timer and the first circuitry is configured to recover a data component and a clock component of the first signal.

8. The device of claim 1, wherein the first receive port and the first transmit port employ single-ended signaling.

9. The device of claim 1, wherein the first receive port and the first transmit port employ differential signaling, and wherein the input of the second device comprises a differential input.

10. The device of claim 9, wherein the threshold represents a first instantaneous voltage and a second instantaneous voltage at the differential input of the second device that are within the voltage range specified by the serial data transmission protocol, the first instantaneous voltage corresponding to a first signal line of the differential input, and the second instantaneous voltage corresponding to a second signal line of the differential input.

11. A system, comprising:
a first device;
a second device; and
a serial data interface connecting the first and second devices, the serial data interface including a repeater, the repeater including:
a first receive port configured to receive a first signal from the first device;
first circuitry configured to process the first signal to restore one or more aspects of the first signal thereby generating a second signal;

a first transmit port configured to transmit the second signal to the second device via a first coupling capacitor, an external capacitor connected to an external capacitor node and the first transmit port;

a supply voltage node connected to a supply voltage; and second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node, wherein the threshold represents an instantaneous voltage at an input of the second device that is within a voltage range specified by a serial data transmission protocol.

12. The system of claim 11, wherein the external capacitor is characterized by a discharge rate that ensures that the instantaneous voltage at the input of the second device remains within the voltage range after the external capacitor is disconnected from the supply voltage node.

13. The system of claim 11, wherein the serial data transmission protocol comprises the Universal Serial Bus (USB) protocol.

14. The system of claim 13, wherein the instantaneous voltage at the input of the second device corresponds to V_TX_DC_AC_CONN of the USB specification and the voltage range is −0.5 to 1.0 volts.

15. The system of claim 11, wherein the repeater further includes:
a second receive port configured to receive a third signal from the second device;
third circuitry configured to process the third signal to restore one or more aspects of the third signal thereby generating a fourth signal; and
a second transmit port configured to transmit the fourth signal to the first device via a second coupling capacitor;
wherein the external capacitor node is connected to the second transmit port, and wherein the threshold also represents an instantaneous voltage at an input of the first device that is within the voltage range specified by the serial data transmission protocol.

16. The system of claim 11, wherein the repeater is a re-driver and the first circuitry is configured to boost a data component of the first signal.

17. The system of claim 11, wherein the repeater is a re-timer and the first circuitry is configured to recover a data component and a clock component of the first signal.

18. The system of claim 11, wherein the first receive port and the first transmit port employ single-ended signaling.

19. The system of claim 11, wherein the first receive port and the first transmit port employ differential signaling, wherein the input of the second device comprises a differential input, and wherein the threshold represents a first instantaneous voltage and a second instantaneous voltage at the differential input of the second device that are within the voltage range specified by the serial data transmission protocol, the first instantaneous voltage corresponding to a first signal line of the differential input, and the second instantaneous voltage corresponding to a second signal line of the differential input.

20. A device, comprising:
a receive port configured to receive a first signal from a first device;
first circuitry configured to process the first signal to restore one or more aspects of the first signal thereby generating a second signal;
a transmit port configured to transmit the second signal to a second device via a coupling capacitor,
an external capacitor node configured for connection to an external capacitor, the external capacitor node being connected to the transmit port;
a supply voltage node configured for connection to a supply voltage; and
second circuitry configured to cause, in response to detecting that the supply voltage has dropped below a threshold, a transmit node associated with the first transmit port to transition to a high impedance state and to control a connection between the external capacitor node and the supply voltage node such that the external capacitor node is disconnected from the supply voltage node, wherein the threshold represents an instantaneous voltage at an input of the second device that is above a lower end of a voltage range specified by a version of the Universal Serial Bus specification.

* * * * *